United States Patent Office 3,451,776
Patented June 24, 1969

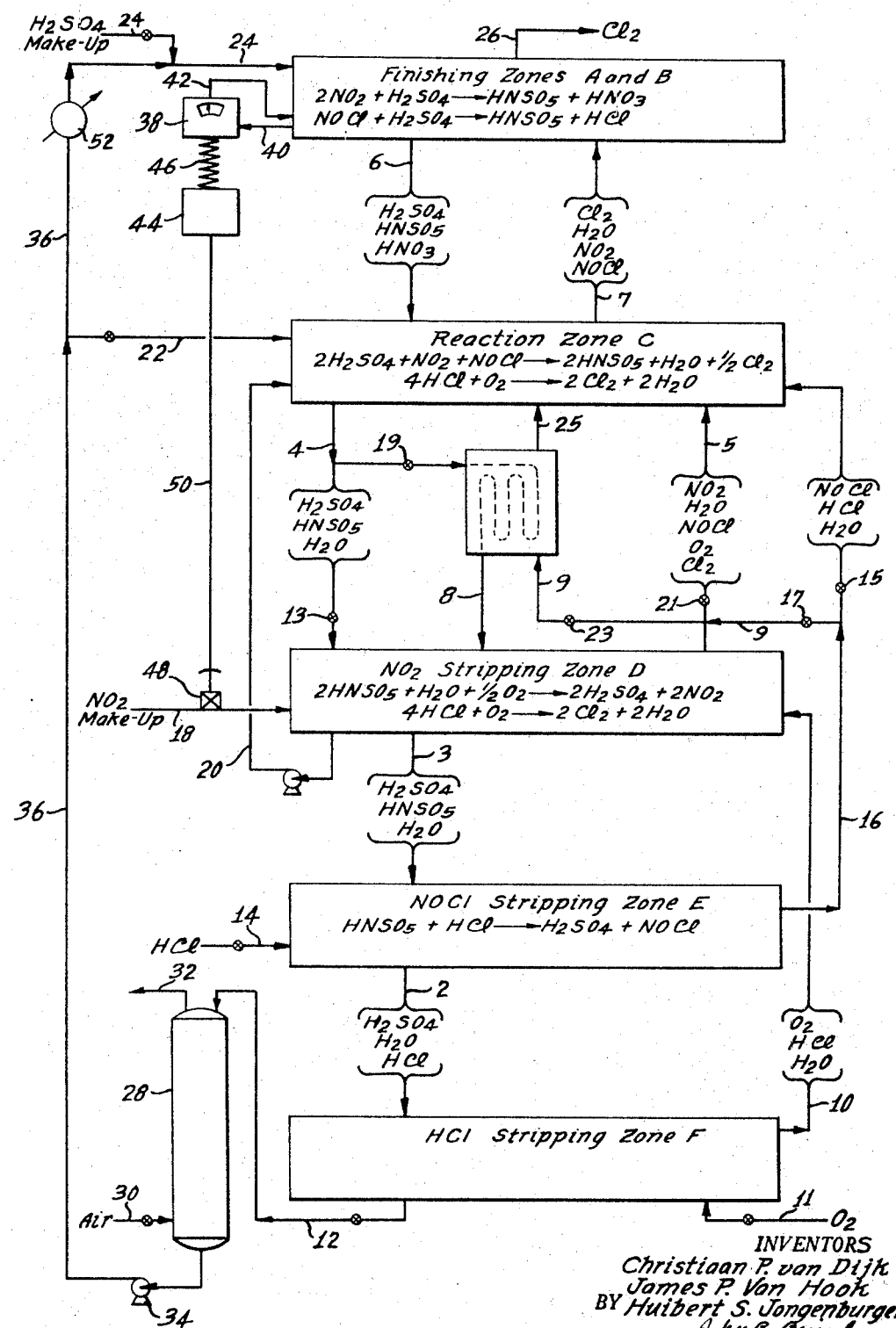

3,451,776
HALOGEN PRODUCTION
Christiaan P. van Dijk, Westfield, James P. van Hook, Basking Ridge, and Huibert S. Jongenburger, Milltown, N.J., assignors to Pullman Incorporated, Chicago, Ill., a corporation of Delaware
Filed Jan. 18, 1965, Ser. No. 426,026
Int. Cl. C01b 7/02, 7/10
U.S. Cl. 23—219                                20 Claims

ABSTRACT OF THE DISCLOSURE

This invention relates to a process for oxidizing a hydrogen halide with oxygen which comprises effecting the reaction in the presence of an oxide of nitrogen catalyst and an excess of sulfuric acid having a concentration of at least 65 percent; in the reaction zone, simultaneously forming a gaseous halogen product and converting a major portion of the oxide of nitrogen to liquid nitrosyl sulfuric acid which, together with the liquid sulfuric acid, forms a liquid mixture; and separately recovering the gaseous effluent and the liquid mixture from the reaction zone. Additional advantages are provided by: (1) auto-regenerating the nitrogen and sulfuric reactants; (2) maintaining oxide of nitrogen contaminant level in the gaseous effluent below 5 percent; (3) allowing not more than a 5 percent reduction in the concentration of sulfuric due to water absorption in the reaction zone; and (4) precontacting the gaseous reactants at a higher temperature than that maintained in the reaction zone.

---

This invention relates to a process for the production of halogen. More specifically, this process relates to the oxidation of an inorganic halide to produce halogen in a high state of purity. One aspect of this invention relates to the oxidation of hydrogen chloride or hydrogen bromide to produce the corresponding chlorine or bromine.

Many processes for the preparation of halogen have been proposed which involve the oxidation of an inorganic halide to produce halogen and water as a by-product of the reaction. However, the yield of halogen in these processes has been limited by the equilibria of the reversible reactions and, therefore, it has not been possible to obtain high conversions of the inorganic halide to halogen. Processes of high commercial value in the production of chlorine are the oxidation of hydrogen chloride represented in Equation 1 and the oxidation of nitrosyl chloride as represented in Equations 2 and 3 below.

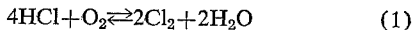
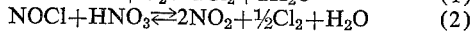
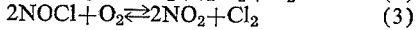

$$4HCl + O_2 \rightleftarrows 2Cl_2 + 2H_2O \quad (1)$$
$$NOCl + HNO_3 \rightleftarrows 2NO_2 + \tfrac{1}{2}Cl_2 + H_2O \quad (2)$$
$$2NOCl + O_2 \rightleftarrows 2NO_2 + Cl_2 \quad (3)$$

Since all of these reactions are reversible, the conversion of the chloride to the desired chlorine product is relatively low. Moreover, the presence of water and/or nitrogen dioxide in the reaction zone dilutes the chloride reactant and necessitates treatment of the reactor effluent in acid-resistant recovery zones in order to obtain substantially pure halogen product.

Therefore, it is an object of the present invention to provide a process for the production of halogen wherein these disadvantages are reduced or entirely eliminated.

Another object of this invention is to provide a commercial and economically feasible process for the production of chlorine or bromine from an inorganic chloride or bromide.

Another object is to provide a self-regenerating process for continuously producing halogen product in a high state of purity.

Another object is to provide a method for substantially complete conversion of hydrogen chloride to chlorine product.

These and other objects of the present invention will become apparent to those skilled in the art from the accompanying description and disclosure.

According to the present invention, an inorganic halide selected from the group consisting of hydrogen chloride and hydrogen bromide, is oxidized with oxygen in the presence of sulfuric acid and a catalytic amount of an inorganic, oxygen-containing compound of nitrogen, preferably nitric oxide, nitrosyl chloride, nitrogen dioxide, nitric acid or mixtures thereof, to form the halogen and water. The oxygen-containing nitrogen catalyst, which by contact with the acid, is present as a three valent nitrogen compound, is removed from the reaction zone and is auto-regenerated in the process for reuse as the catalytic agent. The reaction mixture in the reaction zone is contacted with sulfuric acid, preferably in a countercurrent manner, to form a phase containing the halogen product and a phase containing an aqueous mixture of the three valent nitrogen compound, i.e., nitrosyl sulfuric acid and by-products of the reaction. In reforming sulfuric acid from the nitrosyl sulfuric acid in the system, the oxide of nitrogen catalyst is automatically regenerated and can be reused in the oxidizing reaction. The halogen product is recovered in a substantially pure state by controlling the feeds to the reaction zone in accordance with the residence time required for the formation of product so that the concentration of the nitrogen oxides in the product is maintained, preferably below 5 percent, and most preferably, below 300 parts per million.

Of the inorganic halides reacted in the present process, hydrogen chloride, hydrogen bromide, can be suitably employed, although the chloride is preferred.

The catalytic agents of the present invention are inorganic oxygen-containing compounds of nitrogen wherein the valence of nitrogen is from two to five. Of these, nitrogen monoxide, nitrogen dioxide and nitric acid are preferred; however, compounds which produce nitrogen dioxide in situ, such as, nitrogen trioxide, nitrous acid, nitrogen tetraoxide, and nitrosyl chloride or any intermixture of these catalytic agents or nitrosyl halide with oxygen or air, can also be employed in the process of the present invention. The catalytic agent is employed in the process in catalytic amounts or less than a stoichiometric amount with respect to the hydrogen halide. The oxidizing agent, namely oxygen, can be added as air, ozone or as molecular oxygen.

The process of the present invention generally includes a reaction zone where product is formed, a separation or finishing zone where product effluent from the reaction zone is separated from contaminants and a stripping zone where liquid sulfuric effluent from the reaction zone is treated for the recovery of sulfuric acid and catalytic agent. The reaction zone can comprise a single contacting zone wherein all of the reactant ingredients including the acid are introduced; or it can comprise a precontacting and a contacting zone. In the precontacting zone, only the normally gaseous components are mixed for at least partial reaction prior to contact with sulfuric acid in the contacting zone which follows or is located above.

Generally, the method of operating the present process comprises initially contacting the inorganic halide with the oxygen and catalytic compound of nitrogen in the presence of sulfuric acid in a reaction zone wherein the liquid mixture is maintained at a temperature between about 125° C. and about 275° C., preferably between about 150° C. and about 225° C. under a pressure of from about 600 mm. to about 150 atmospheres, preferably from 5 atmospheres to 25 atmospheres to produce halogen product in admixture with small amounts of water and compounds of nitrogen, for example, nitrogen monoxide, nitrogen dioxide and nitrosyl chloride. The halogen product which is unaffected by the sulfuric acid, is obtained as a separate mixture which is preferably analyzed for oxide of nitrogen content to control the purity of the product. The reaction zone effluent or halogen product phase is then passed in a countercurrent manner in contact with sulfuric acid of at least 65 percent concentration in a separation or finishing zone in one or a plurality of stages. The separation zone is maintained between about 30° C. and about 225° C.

When the oxide of nitrogen concentration in the halogen product mixture rises above a predetermined level of not more than about 20 percent based on halogen, preferably about 1.5 percent or less, either the rate of addition of nitrogen-containing oxidizing agent feed is lowered and/or the feed rates of the other components of the reaction mixture, such as oxygen, sulfuric acid and/or the inorganic halide, are adjusted until the concentration of oxides of nitrogen in the halogen product mixture falls below the predetermined level, most preferably between about 1 percent and about 0.01 percent. In adjusting the feed rates for optimum results, it is recommended that the $HCl:O_2$ mole ratio be fixed at an excess of oxygen not more than about 100 mole percent above stoichiometry, preferably at a slight excess of up to about 30 percent. When the hydrogen halide concentration rises above a predetermined level of more than 10 mole percent, the feed rate of the oxidizing agent and/or the catalyst should be increased. By adjusting the feed streams to meet these requirements, the halogen product can be recovered from the process, preferably as a gas, in a concentration of greater than 90 percent purity, as compared with the usual less than 50 percent halogen in gaseous admixture with contaminants such as oxygen, oxides of nitrogen, water, etc., obtained in other commercial processes.

The sulfuric acid sorbs the water of reaction as it is formed and reacts with the nitrogen compound, i.e., the sulfuric sorbs nitrogen trioxide and/or nitrogen dioxide, to form a three valent nitrogen compound (e.g., nitrosyl sulfuric acid in aqueous sulfuric acid solution. The nitrosyl sulfuric acid solution may also contain some unreacted nitrogen monoxide, nitrogen dioxide and a small amount of nitric acid by sorption or entrainment.

From the standpoint of economy and efficiency, it is desirable to recover the catalytic agent and the sulfuric acid from the sulfuric acid-nitrosyl sulfuric acid mixture instead of merely drying and passing air through this mixture before recycling it to the process. In the stripping operation, the nitrosyl sulfuric acid solution is removed from the reaction zone, located in the upper or middle portion of a reaction tower, and passed to a stripping zone where it is treated with oxygen and/or hydrogen halide, preferably in a lower zone of the tower. In this stripping zone, maintained at a temperature between about 100° C. and about 250° C., sulfuric acid is regenerated with the consequent auto-regeneration or liberation of the catalytic agent as nitrosyl chloride and/or nitrogen dioxide. The catalytic agent recovered is recycled to the reaction zone at the conditions employed therein.

The nitrosyl sulfuric acid can be treated simultaneously with oxygen and hydrogen halide although it is preferred to treat the acid first with oxygen in a first oxygen treating zone wherein sulfuric acid and nitrogen dioxide are simultaneously regenerated and then, in a separate zone, to treat the nitrosyl sulfuric acid with hydrogen halide for additional regeneration of sulfuric acid and for stripping gaseous inorganic halide catalyst (e.g., nitrosyl chloride) and gaseous by-products of the reaction from the sulfuric acid prior to recycle to the reaction zone. The resulting liquid mixture from the hydrogen halide treating zone is then stripped with oxygen in a final stripping zone of the tower to recover any hydrogen halide present as a gaseous effluent. In this preferred treatment, the gaseous mixture or effluent rich in oxygen from the final stripping zone is recycled to the first oxygen treating zone by-passing the hydrogen halide treating zone and the gaseous mixture rich in nitrosyl halide from the hydrogen halide treating zone is passed directly to the reaction zone, thus by-passing the first oxygen treating zone. This method of handling liquid reactor effluent for recovery and regeneration of reaction components is preferred over passing the gases up the tower sequentially through each of the zones. The reason for this is that the presence of oxygen in the hydrogen halide treating zone promotes side reactions, reducing the stripping effect of the hydrogen halide by providing a favorable atmosphere for the conversion of the halide to halogen instead of the desired complete conversion of the nitrosyl sulfuric acid with hydrogen halide to the nitrosyl halide. On the other hand, the gas from the hydrogen halide treating zone acts as a diluent for the oxygen in the first oxygen treating zone; thus, it is preferred to conduct the oxygen and the hydrogen halide treatment in separate zones. Other alternatives to this preferred method of operation include elimination of one of the treating zones. It is to be understood, of course, that oxygen, air, ozone or mixtures thereof can be employed in the stripping zones indicated, but that molecular oxygen is preferred.

In the case where the separate oxygen stripping zone is omitted in treatment of the nitrosyl sulfuric acid reactor effluent, the hydrogen halide is used to react with the nitrosyl sulfuric acid to produce nitrosyl chloride and sulfuric acid. If necessary, residual hydrogen halide can be stripped from the regenerated sulfuric acid with oxygen. In the case where the first oxygen treating zone is entirely omitted, the oxygen required for the oxidation reaction is either passed into the final oxygen stripping zone or it can be passed directly into the reaction zone wherein it converts hydrogen halide to halogen and regenerates sulfuric acid and the catalytic agent. It is also possible to combine the oxygen-containing stream with the gaseous effluent from the hydrogen chloride treating zone and to allow for partial reaction of these components prior to contact with sulfuric acid in a precontacting zone of the reaction zone. In this case, the temperature is advantageously controlled by indirect heat exchange, preferably with the sulfuric acid stream coming from the upper contacting zone of the reaction zone.

After stripping, an aqueous solution of sulfuric acid is withdrawn from the contactor or reaction tower, distilled or flashed and stripped with an inert gas, such as, for example, air, nitrogen, etc., to restore its original concentration of at least 65 percent, preferably at least 75 percent, in aqueous solution prior to recycle to the reaction zone.

In the process of the present invention, it is important that the concentration of oxides of nitrogen in the halogen product effluent in the contactor be maintained below 15 percent, preferably below 1 percent, based on total volume. To ensure operation below the maximum concentration, a portion of the product effluent can be passed through an analyzer for measuring the concentration of oxides of nitrogen, either at intervals or throughout the operation of the process, and the feed rates are adjusted accordingly. If desired, the analyzer can be electrically connected to the catalyst feed line and/or the stripping oxygen feed line and/or other feed lines in the process to automatically control the amount of feed introduced into the reaction zone in accordance with the tolerable amount of oxide of nitrogen in the gaseous product mixture. Otherwise, the control of nitrogen-containing catalytic agent, oxygen and/or other feeds can be independently effected in accordance with the gas analysis of the product effluent. Since excess oxides of nitrogen, particularly nitrogen dioxide, in the product effluent necessitates further treating in uneconomical and inefficient purification stages as, for example, distillation or extraction, it is desirable to obtain the halogen product in a high state of purity. Most preferably, the concentration of the catalytic agent in the product effluent is maintained between about 100 p.p.m. and about 3,000 p.p.m.

The overall process can be carried out under adiabatic conditions with respect to the operation of the contactor whereby the sulfuric acid sorbent takes up the heat of reaction to cool the reaction zone and is later air cooled or flashed and cooled in a separate zone or in a series of separate zones. Thus, the sulfuric acid dissipates the heat absorbed and controls the temperature in the reaction zone by the temperature of the sulfuric acid recycle.

A modification and further improvement of this process comprises passing the halogen product mixture withdrawn from the reaction zone countercurrently with an additional amount of sulfuric acid, preferably of at least 75 percent concentration, at a lower temperature than that employed in the reaction zone whereby remaining amounts of water are absorbed by the acid and any remaining amounts of nitrogen oxides, as for example, nitrosyl chloride and nitrogen dioxide, are removed from the halogen product in the separation or finishing zone which comprises one or more separate chambers. The contaminants removed, together with the sulfuric acid from the finishing zone are returned to the contacting zone of the reaction zone.

For the most economical operation of the present process and for greater facility in product separation, it is desirable to operate the process in the reaction zone under conditions of temperature and pressure which will provide a gaseous product phase and a liquid sulfuric contacted phase. In this manner, the rising gas phase can be easily separated and removed as substantially pure halogen product from the top of the contactor or reaction tower. The by-products of the reaction contained in the liquid phase can be passed by gravitational flow into the lower treating zones where they are regenerated. However, it is within the scope of this invention to operate the process in the reaction zone at temperatures and pressures which will produce the halogen product in the liquid state, for example, at a total pressure corresponding to a halogen partial pressure which is above the vapor pressure of chlorine at the temperature of operation. In this case, a two-phase liquid mixture is formed in the separation or finishing zone; one being the halogen product and the other being the sulfuric acid and liquid by-product mixture. When it is desirable to use this mode of operation, the upper portion of the contactor is preferably a packed column which is run under flood conditions.

Although the entire process discussed above can be carried out in a series of separate units, it is preferred to carry out the process in a unitary contactor or reaction tower. For ease of operation, it has been found most advantageous to employ a separate sulfuric acid stripping zone outside the unitary contactor especially when air is used for stripping water from the sulfuric acid prior to recycle.

The process when carried out in the manner described above, is self-regenerating as illustrated by the equations below, which are representative of the reactions taking place within the contactor in the HCl-NO$_2$ system.

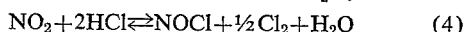 (4)
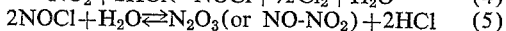 (5)
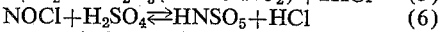 (6)
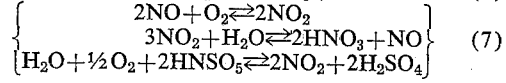 (7)

It is to be understood, however, that the above equations summarize the reactions taking place in the contactor and that some of the above reactions may be obviated by varying the feed streams to the zones.

The advantage of auto-regeneration in the present process is illustrated by the above equations, for it can be seen that hydrogen halide reactant is regenerated by reacting by-product nitrosyl halide with sulfuric acid and that the nitrogen dioxide oxidizing agent is regenerated from the sulfuric complex which is formed in the process as a result of maintaining the recommended operating conditions such as a relatively high ratio of sulfuric acid in the system with respect to halogen and nitrogen compounds, a sulfuric acid of at least 65 percent concentration, preferably at least 75 percent, and temperature and pressure conditions within the range recited above. The flow ratio of sulfuric acid to halogen produced is maintained between about 5:1 pounds per pound and about 200:1 pounds per pound, preferably between about 10:1 pounds per pounds and about 40:1 pounds per pound.

In the present process, it is desirable to introduce both the inorganic halide and the catalytic agent into the lower portion of the reaction zone with separate addition of sulfuric acid in the upper portion of said zone. An alternative method, however, is to introduce the catalytic agent (especially when using nitric acid) in admixture with the sulfuric acid in the upper portion of the reaction zone and to contact this mixture countercurrently with the inorganic halide and oxygen for reaction and immediate absorption of nitrosyl halide as it is formed in the process. This latter method of contacting is somewhat more efficient in shifting the equilibrium of the reaction toward the formation of more halogen product and removing water of reaction as it is formed in the process; the prior method, however, provides better contact between the reactants of the system.

In the reaction of the present invention, the major portion, preferably more than 90 percent, of all the nitrogen compound entering the reaction zone is aborbed, the major portion of which is absorbed as nitrosyl sulfuric acid, and is mixed with the sulfuric acid in the liquid phase. The proportion of nitrosyl-sulfuric acid in the sulfuric mixture is a minor amount of the mixture and the amount of catalyst fed to the system is less than 10 mole percent based on hydrogen halide.

In the process of the present invention, while concentrations of sulfuric acid between 65 percent and about 100 percent can be employed, from an economic standpoint, a concentration of from about 75 percent to about 95 percent is preferred. Since the economy of the present process is markedly decreased when an acid concentration above 96 percent sulfuric is maintained, acid of this concentration is not recommended for commercial operation.

In the process of the two-stage sulfuric treatment of the product effluent in the separation zone, it has been found advantageous to employ a more concentrated sulfuric acid in the second treatment than the first and this second sulfuric solution is preferably maintained at a temperature of at least 5° or 10° below the temperature of the first sulfuric solution, preferably at a temperature close to ambient temperature, to provide for the condensation of any additional quantities of water entrained in the halogen product. By utilizing this improvement, the halogen product can be obtained in a state of purity of greater than 95 percent, substantially free of water.

For a better understanding of the present invention, reference is now had to the accompanying drawing which illustrates a specific and preferred embodiment of the process and is not to be construed in any way limiting to the scope of this invention.

The figure is a schematic drawing wherein the several zones, A through G of the unitary contactor or reaction tower are separated for the purpose of clearer, more precise description of the process. It is to be understood, however, that in commercial operation, where zones are contained in a single unitary contacting tower, they are separated by foraminous plates to provide communication from one zone to the other. Thus, in the unitary contacting tower, lines 2 through 9 for transporting liquid and gases between the zones are obviated, and the passage of these materials is automatically accomplished through the perforated trays which, if desired, support a layer of packing material such as, for example, ceramic Berl saddles. With the conditions and reactants employed in the embodiment discussed below, it is preferred to avoid passing the gases from the lower stripping zones successively through the stripping zones above. In order that by-product formation and dilution be kept to a minimum, the passage of vapors upwardly to the specific zones shown in the drawing is recommended. Other modifications in the equipment design which are within the scope of this invention, will become apparent to those skilled in the art from the following description.

In general, the liquid phase in the contactor, mostly comprising a sulfuric acid solution, flows from the top of the contactor downwardly, while the gaseous phase containing reactants, products, by-products, and intermediates, pass upwardly in the tower for countercurrent contact with the liquid. The tower is operated under a pressure of about 10 atmospheres and the concentration of sulfuric acid fed to the reaction zone is maintained constant (between about 80 and 82.5 percent) during the operation. The flow rates recited in the following example, are given in pound moles per hour.

The main reaction taking place in the tower for the production of chlorine, as shown in figure, comprises the reaction of sulfuric acid, nitrosyl chloride and nitrogen dioxide to produce gaseous chlorine product and an aqueous solution of nitrosyl sulfuric acid and sulfuric acid in reaction zone C. The gaseous product containing contaminants is passed upwardly through two separate finishing zones A and B in the top of the tower, wherein it is washed with sulfuric acid for purification of chlorine product before removal from the contactor. The liquid phase from reaction zone C as passed downwardly through a series of stripping zones D, E and F wherein the liquid is first treated with oxygen to generate sulfuric acid and nitrogen dioxide; then with reactant hydrogen chloride to generate nitrosyl chloride and finally with oxygen to recover gaseous hydrogen chloride from the liquid sulfuric acid. The resulting aqueous sulfuric acid is removed from the bottom of the tower, regenerated and returned to reaction zone C and upper finishing zone B.

In a specific embodiment of this process, about 18 pound moles per hour of oxygen is introduced through valved line 11 into stripping zone F which contains the mixture of aqueous sulfuric acid and hydrogen chloride introduced from stripping zone E above by means of line 2. At a temperature of about 180° C. about 18 pound moles of oxygen, 6 pound moles of hydrogen chloride and about 3 pound moles of water are stripped as a gas from aqueous sulfuric acid in zone F. This gaseous mixture is passed upwardly to the nitrogen dioxide stripping zone D by means of line 10, thus by-passing stripping zone E wherein the gaseous mixture would cause dilution and consumption of the hydrogen chloride reactant and stripping gas. Aqueous sulfuric acid of about 80 percent concentration is removed at a rate of about 64,000 pounds per hour from the bottom of zone F and from the contactor by means of line 12. The aqueous sulfuric acid solution withdrawn from the bottom of the contactor is passed to concentrating zone 28 wherein at a temperature of about 160° C., under 1 atmosphere pressure, the aqueous solution is counter-currently blown with air entering zone 28 from valved line 30 at a rate of 90 pound moles per hour. Water vapor is removed from the upper portion of zone 28 by means of line 32 at a rate such that the original concentration of sulfuric acid (82.2 percent) is restored. The regenerated sulfuric solution is then pumped by means of pump 34 through lines 36 and 22 for recycle to the upper portion of reaction zone C at a rate of about 59,000 pounds per hour.

About 60 pound moles of hydrogen chloride is introduced by means of valved line 14 into nitrosyl chloride stripping zone E above stripping zone F. Into zone E is fed a liquid mixture of aqueous sulfuric acid (about 61,000 pounds of 80 percent acid) and nitrosyl sulfuric acid (36 pound moles) from the upper stripping zone D. In zone E, at a temperature of about 180° C., nitrosyl chloride and sulfuric acid are generated by the reaction of the hydrogen chloride with liquid nitrosyl sulfuric acid flowing downwardly through the tower from zones C and D above. The vaporous phase formed in zone E, comprising approximately 36 pound moles of nitrosyl chloride, 19 pound moles of hydrogen chloride and 14 pound moles of water, is separated from the remaining liquid phase which comprises approximately 64,000 pounds of 81.5 percent sulfuric acid and 6 pound moles of hydrogen chloride. The liquid phase from zone E is passed downwardly through line 2 into zone F for stripping with oxygen, while the vapor phase is removed from zone E and introduced into reaction zone C by means of line 16, thus by-passing the upper stripping zone D and avoiding dilution of the reactants therein. For the presently described embodiment, valves 13 and 15 are opened and valves 17 and 19 are closed.

Into the nitrogen dioxide stripping zone C is introduced oxygen and hydrogen chloride from line 10 and an aqueous solution of sulfuric acid (120,000 pounds of 79 percent acid) and nitrosyl sulfuric acid (137 pound moles) from line 4 of the reaction zone C above. Reaction between the liquid nitrosyl sulfuric acid and oxygen is effected in zone D at a temperature of about 185° C. in the presence of a secondary oxidation reaction of hydrogen chloride to chlorine. Into stripping zone D, make-up nitrogen dioxide catalyst can also be fed from valved line 18 to compensate for nitrogen dioxide loss or deficiency in the process. The amount of catalyst added is about 0.01 pound mole per hour. The vaporous fraction formed in zone D comprising about 60 pound moles of nitrogen dioxide, 17 pound moles of water and 4 pound moles of nitrosyl chloride, is stripped and introduced into reaction zone C by means of valved line 5 (valve 21 being open and valve 23 being closed). In the interior tower, this material is passed from zone D to zone C by diffusion through a demister tray in a tower. The remaining liquid fraction containing about 122,000 pounds of aqueous sulfuric acid and 72 pound moles of nitrosyl sulfuric acid is divided into two streams; one comprising about 61,000 pounds of sulfuric acid and 36 pound moles of nitrosyl sulfuric acid is passed to the lower stripping zone E and the remaining portion of the liquid is recycled to reaction zone C by means of valved line 20 to maintain the high sulfuric acid excess in the reaction zone. A major portion of nitrogen dioxide catalyst is regenerated in stripping zone D so that only a minor amount of nitrogen dioxide need be fed to the contactor from valved line 18 during the entire operation to replenish the nitrogen dioxide in the process.

The gaseous mixtures from the lower stripping zones which are introduced into reaction zone C from lines 5 and 16 are contacted with sulfuric acid at a temperature of about 200° C. In this zone, a large excess of sulfuric acid is present at all times. To maintain this excess, about 59,000 pounds of 82.2 percent aqueous recycle sulfuric acid is introduced into the upper portion of this zone by means of line 22 for countercurrent contact with the reactant gases; and about 61,000 pounds of 79 percent sulfuric acid is introduced into the zone by means of recycle line 20 from zone D. The overall reaction taking place in the reaction zone comprises the oxidation of nitrosyl chloride in the presence of sulfuric acid to produce chlorine and nitrosyl sulfuric acid in the presence of a major portion of unreacted sulfuric acid. The high excess of sulfuric acid ensures substantially complete conversion of the catalyst to nitrosyl sulfuric acid and reduces to a minimum the nitrogen oxide gas in the product effluent stream. In zone C, a vaporous phase, comprising about 30 pound moles of chlorine with minor amounts of entrained nitrogen dioxide and water impurities, is formed which vaporous mixture is easily separated from the liquid sulfuric acid solution containing by-products. This gaseous phase is passed upwardly through two successive finishing zones A and B wherein the gas is separately and countercurrently contacted with 80 percent sulfuric acid (about 5,000 pounds) introduced from valved line 24 at a temperature of about 40° C. The amount of sulfuric acid in the system and the temperature of the product gas is controlled by make-up sulfuric acid feed to line 24 entering at a temperature of about 20° C. The temperature of recycle sulfuric acid introduced into the finishing zone or zones is controlled by passing recycle sulfuric acid from line 36 into cooler 52 prior to use as a wash liquid in the finishing zones. The final finishing zone can be maintained at a lower temperature than the first, e.g., at a temperature of from about 20° to 35° C., and about 5° or 10° below the temperature of the first.

A small portion (about 2 percent) of the gases entering the first finishing zone is passed by means of line 40 to gas analyzer 38 for analysis of nitrogen dioxide contained therein and returned to the finishing zone by means of line 42. After start-up, the process proceeds in a self-regenerating manner so that only small amounts of nitrogen dioxide need be added to the system through line 18 as make-up feed. In this embodiment, nitrogen dioxide feed line 18 is electrically responsive to analyzer 38. The gas analyzer represents a primary sensing element which sends out an electrical impulse to pneumatic control box 44 through coil 46. Feed line 18 is equipped with an air operated control valve 48 for regulating the flow of nitrogen dioxide to the process. The diaphragm of the air motor on the control valve is connected to control box 44 by conduit 50 which actuates the opening and closing of said valve in response to the nitrogen dioxide concentration of the product effluent gases. Thus, the amount of nitrogen dioxide make-up fed to the system is dependent upon the concentration of the nitrogen dioxide in the product gases entering the finishing zone. In this specific embodiment, the concentration of nitrogen dioxide was allowed to build up to a maximum of .3 percent total volume before an automatic shut-off was exerted on line 18 through which the nitrogen dioxide is introduced at a rate of about 2 pound moles per hour. The nitrogen dioxide addition through valved line 18 was not resumed until the concentration of nitrogen dioxide in the gaseous product effluent entering the finishing zone reached a concentration of 0.1 percent total volume. It is to be understood, however, that instead of regulating the flow of nitrogen dioxide to the contactor, the oxygen supply can be so regulated in response to analyzer 38 to restrict the amount of oxygen introduced into the system as the concentration of nitrogen dioxide approaches the upper limit. The reduced supply of oxygen serves to decrease the concentration of $NO_2$ in the product gas analyzed. Also, it is to be understood that a combination of electrically or automatically controlled oxygen and nitrogen dioxide feed lines can be used in the present proceeds for controlling the composition of the gaseous product effluent.

The gaseous product effluent after the second contact with sulfuric acid for removal of remaining amounts of water and oxides of nitrogen is passed upwardly and removed from the top of the tower through line 26 in a concentration of 90 percent chlorine gas, at a rate of about 33 pound moles per hour. The impurities removed from the chlorine in the upper finishing zones are removed for the most part as nitrosyl sulfuric acid and nitric acid (about 5 pound moles) absorbed in sulfuric acid (about 5,000 pounds) which is returned to reaction zone C by means of line 6.

It is to be understood that in the above embodiment, hydrogen bromide can be substituted for hydrogen chloride as the inorganic halide reactant, in which case, the corresponding bromide derivatives such as hydrogen bromide, nitrosyl bromide and bromine will be formed.

In another embodiment of the above process, zone D can be omitted, in which case, any make-up $NO_2$ required by the process is fed directly into reaction zone C and the liquid acid mixture from zone C is passed into zone E after heating by heat exchange. In this case, the gaseous effluents from zones E and F are combined, cooled by indirect heat exchange with the liquid acid mixture, and the cooled gaseous mixture is introduced into reaction zone C. Since the combined gaseous mixture is passed in indirect heat exchange with the descending liquid acid mixture, it is possible to operate with relatively large temperature differences between the gaseous and liquid phases entering and leaving the reaction zone. This further improvement provides a distinct advantage in the process since it is desirable to carry out the oxidation reaction at high temperatures (e.g., up to about 450° C.) while it is also desirable to maintain the liquid acid mixture in the nitrosyl chloride stripping zone and the reaction zone at a significantly lower temperature (e.g., from 125° C. to 250° C.) for optimum separation of product and regeneration of sulfuric acid. This method of operation, which provides a process wherein the reactant gases are pre-contacted and reacted prior to direct contact with the sulfuric acid, results in more efficient contacting of gaseous reactants before the second reaction of by-product removal by sulfuric acid sorption occurs.

Still another embodiment of the present process which provides for precontacting reactant vaporous stream in a precontacting zone comprises, in the drawing, closing valves 15, 21 and 13 and opening valves 19, 23 and 17. In this manner, the gaseous mixture from zone E passes through lines 16 and 9 and is admixed with the gaseous effluent from zone D for entry into precontacting zone G. In precontacting zone G, hydrogen chloride is oxidized with oxygen to produce chlorine and the hot gases entering zone G are cooled by indirect heat exchange with the sulfuric-nitrosyl sulfuric acid mixture passing downwardly through line 8 from reaction zone or upper contacting zone C. The cooled gaseous mixture from zone G is then passed into the upper contacting zone C by means of line 25 and the liquid sulfuric mixture enters zone D for stripping of nitrogen dioxide as described above.

It will become apparent to those skilled in the art that many modifications and variations of the above embodiments can be made without departing from the scope of this invention. For example, hydrogen bromide can be substituted for hydrogen chloride to produce product bromine, if desired, under suitable temperature and pressure conditions. Also, when nitric acid is the catalyst, it can be introduced into the reaction zone in admixture with the sulfuric acid fed to this zone. Also, the nitrogen dioxide catalyst used in the above-described embodiment can be substituted by mixtures of the oxides of nitrogen previously described in substantially the same amounts recited in the embodiment. Many other modifications will become apparent to those skilled in the art from the above disclosure.

Having thus described our invention we claim:
1. The process for producing halogen which comprises: reacting an inorganic halide selected from the group consisting of hydrogen chloride and hydrogen bromide with oxygen in the presence of an inorganic oxygen-containing compound of nitrogen as a catalyst and in the presence of liquid sulfuric acid of at least 65 percent concentration to form the corresponding halogen and to convert a major portion of the inorganic oxygen-containing compound of nitrogen to liquid nitrosyl sulfuric acid during the course of the reaction in the reaction zone, said nitrosyl sulfuric acid being formed in the presence of excess liquid sulfuric acid; removing the liquid nitrosyl sulfuric acid from the reaction zone; and auto-regenerating the inorganic oxygen-containing compound of nitrogen by treating the nitrosyl sulfuric acid mixture in a stripping zone with at least one gas selected from the group consisting of the inorganic halide, oxygen and mixtures of these gases to regenerate and recover the sulfuric acid; and recovering the halogen from the reaction zone.

11

2. The process for producing halogen which comprises: reacting an inorganic halide selected from the group consisting of hydrogen chloride and hydrogen bromide with oxygen in the presence of an inorganic oxygen-containing compound of nitrogen as a catalyst and in the presence of sulfuric acid of at least 65 percent concentration in a reaction zone to form the halogen product and to convert a major portion of the inorganic oxygen-containing compound of nitrogen to liquid nitrosyl sulfuric acid during the course of the reaction, the nitrosyl sulfuric acid being formed in the presence of excess liquid sulfuric acid in the reaction in the reaction zone; recovering halogen product as a gas withdrawing the liquid nitrosyl sulfuric acid from the reaction zone; auto-regenerating the inorganic oxygen-containing compound of nitrogen by treating the nitrosyl sulfuric acid-sulfuric acid mixture in a separate stripping zone with gaseous hydrogen halide to regenerate and recover sulfuric acid as a liquid and nitrosyl halide as a gas; and recycling the nitrosyl halide to the reaction zone to supply at least a portion of the oxygen-containing compound of nitrogen in said reaction zone.

3. The process for producing halogen which comprises: reacting an inorganic halide selected from the group consisting of hydrogen chloride and hydrogen bromide with oxygen in the presence of an inorganic oxygen-containing compound of nitrogen as a catalyst and in the presence of sulfuric acid of at least 65 percent concentration in a reaction zone to form the halogen product and to convert a major portion of the inorganic oxygen-containing compound of nitrogen to liquid nitrosyl sulfuric acid during the course of the reaction, the nitrosyl sulfuric acid being formed in the presence of excess liquid sulfuric acid in the reaction zone; recovering halogen product as a gas; withdrawing the liquid nitrosyl sulfuric acid from the reaction zone; auto-regenerating the inorganic oxygen-containing compound of nitrogen by treating the liquid nitrosyl sulfuric acid-sulfuric acid mixture in a separate stripping zone with gaseous oxygen to regenerate and recover sulfuric acid as a liquid mixture and nitrogen dioxide as a gas; and recycling the nitrogen dioxide to the reaction zone to supply at least a portion of the oxygen-containing compound of nitrogen in said reaction zone.

4. The process of claim 3 wherein the sulfuric acid liquid mixture from said separate stripping zone is treated with hydrogen halide in a second regeneration step in a second stripping zone to recover an additional quantity of sulfuric acid liquid and nitrosyl halide; the nitrosyl halide gas is passed to said reaction zone to supply at least a portion of the oxygen-containing compound of nitrogen in said reaction zone; the sulfuric acid from the hydrogen halide treatment is stripped with a gas selected from the group consisting of oxygen and halogen to recover any hydrogen halide entrained in the sulfuric acid liquid and the resulting sulfuric acid liquid is returned to the reaction zone at the concentration maintained therein.

5. In a process for producing halogen which comprises: in a reaction zone, reacting an inorganic halide selected from the group consisting of hydrogen chloride and hydrogen bromide with a molar excess of oxygen up to not more than 100 moles per mole of hydrogen halide, in the presence of an inorganic oxygen-containing compound of nitrogen as a catalyst selected from the group consisting of a nitrogen oxide, nitrosyl halide and mixtures thereof; carrying out the reaction also in the presence of sulfuric acid of at least 65 percent concentration to form the corresponding halogen product and to convert a major portion of the oxygen-containing compound of nitrogen to nitrosyl sulfuric acid, said nitrosyl sulfuric acid being formed in the presence of excess sulfuric acid to provide a liquid mixture containing sulfuric acid and nitrosyl sulfuric acid in the reaction zone; recovering halogen product as a gas; withdrawing the liquid mixture from the reaction zone; auto-regenerating the inorganic oxygen-containing compound of nitrogen by treating the nitrosyl sulfuric acid-sulfuric acid mixture in a separate stripping zone with at least one gas selected from the group consisting of the inorganic halide, oxygen and mixtures thereof to regenerate and recover the sulfuric acid; recycling the regenerated sulfuric acid and the oxygen-containing compound of nitrogen to the reaction zone; and feeding fresh oxygen-containing nitrogen catalyst to the reaction zone in an amount of not more than 10 mole percent based on hydrogen halide.

6. The process for producing halogen which comprises: reacting an inorganic halide selected from the group consisting of hydrogen chloride and hydrogen bromide with oxygen in the presence of an inorganic oxygen-containing compound of nitrogen as a catalyst selected from the group consisting of a nitrogen oxide, nitric acid, nitrosyl halide and mixtures thereof and in the presence of sulfuric acid of at least 65 percent concentration in a contacting zone of a reaction zone to form the halogen product and to convert a major portion of the inorganic oxygen-containing compound of nitrogen to nitrosyl sulfuric acid during the course of the reaction, the nitrosyl sulfuric acid being formed in the presence of excess liquid sulfuric acid in the contacting zone to form a liquid mixture of the acids; recovering substantially pure halogen product as a gas; auto-regenerating the inorganic oxygen-containing compound of nitrogen by treating the nitrosyl sulfuric acid-sulfuric acid mixture in a separate stripping zone at a temperature at least 5° higher than that maintained in the contacting zone with at least one gas selected from the group consisting of the inorganic halide, oxygen and mixtures thereof to regenerate and recover sulfuric acid as a liquid mixture and the inorganic oxygen-containing compound of nitrogen as a gas; admixing the regenerated inorganic oxygen-containing compound of nitrogen, the inorganic halide and oxygen; passing the resulting admixture in indirect heat exchange with liquid nitrosyl sulfuric acid-sulfuric acid from the reaction zone in a precontacting zone to cool the gaseous mixture to the desired temperature of reaction; and passing the cooled mixture from the precontacting zone into the contacting zone in direct contact with the sulfuric acid.

7. The process of claim 1 wherein the reaction zone is maintained at a temperature between about 125° C. and about 275° C.

8. The process for producing halogen which comprises: reacting an inorganic halide selected from the group consisting of hydrogen chloride and hydrogen bromide with oxygen in the presence of an inorganic oxygen-containing compound of nitrogen as a catalyst selected from the group consisting of a nitrogen oxide, nitric acid, nitrosyl halide and mixtures thereof and in the presence of liquid sulfuric acid of at least 65 percent concentration in a reaction zone to form a gaseous halogen product phase and a liquid phase containing sulfuric acid and nitrosyl sulfuric acid; maintaining the weight ratio of sulfuric acid entering the reaction zone to halogen produced between about 5:1 and about 200:1; withdrawing the gaseous phase and countercurrently contacting said gas with sulfuric acid of at least 65 percent concentration in a finishing zone at a temperature at least 5° below the temperature maintained in the reaction zone; recovering halogen gas containing less than 5 percent oxide of nitrogen impurity from said finishing zone; withdrawing the liquid phase from said reaction zone and in a separate stripping zone, treating said liquid phase with at least one gas selected from the group consisting of the inorganic halide, oxygen and mixtures thereof to simultaneously regenerate sulfuric acid as a liquid and the inorganic oxygen-containing compound of nitrogen as a gas; reconcentrating and recycling sulfuric acid to the reaction and finishing zones; introducing the regenerated inorganic oxygen-containing compound of nitrogen in admixture with the inorganic halide into the reaction zone and contacting the gaseous mixture with liquid sulfuric acid in a countercurrent manner.

9. The process of claim 8 wherein fresh inorganic oxygen-containing nitrogen compound is added to the process in less than 10 mole percent based on the hydrogen halide reactant.

10. The process for producing chlorine which comprises: introducing hydrogen chloride and a molar excess of oxygen into a reaction zone and reacting the mixture in the presence of a less than stoichiometric amount, based on hydrogen halide in the reaction zone, of an inorganic oxygen-containing compound of nitrogen as a catalyst selected from the group consisting of a nitrogen oxide, nitric acid, nitrosyl chloride and mixtures thereof and in the presence of liquid sulfuric acid of at least 75 percent concentration to form gaseous chlorine and a liquid phase containing a mixture of sulfuric acid and nitrosyl sulfuric acid and wherein a major portion of the inorganic oxygen-containing compound of nitrogen is converted to liquid nitrosyl sulfuric acid by contact with the sulfuric acid in a molar excess of at least 10:1 with respect to the catalyst; recovering substantially pure chlorine from said reaction zone; and auto-regenerating the inorganic oxygen-containing compound of nitrogen by contacting the nitrosyl sulfuric acid-sulfuric acid mixture in a separate stripping zone with oxygen to regenerate liquid sulfuric acid from the nitrosyl sulfuric acid in the mixture.

11. The process of claim 10 wherein the recovered sulfuric acid, which is diluted with water of reaction, is reconcentrated up to at least 75 percent concentration and recycled to said reaction zone.

12. The process of claim 10 wherein the inorganic oxygen-containing compound of nitrogen is introduced as a gaseous mixture with hydrogen chloride and oxygen in the reaction zone.

13. The process for producing chlorine which comprises: introducing hydrogen chloride and a molar excess of oxygen into a reaction zone and reacting the mixture in the presence of an inorganic oxygen-containing compound of nitrogen as a catalyst selected from the group consisting of a nitrogen oxide, nitric acid, nitrosyl chloride and mixtures thereof and in the presence of liquid sulfuric acid of at least 75 percent concentration to form halogen product and to convert a major portion of the inorganic oxygen-containing compound of nitrogen to liquid nitrosyl sulfuric acid during the course of the reaction, forming the nitrosyl sulfuric acid in excess sulfuric acid solution in the reaction zone; separately treating the chlorine product with sulfuric acid of at least 75 percent concentration at a temperature below reaction temperature and recovering the sulfuric-washed chlorine product as a product of the process; auto-regenerating the inorganic oxygen-containing compound of nitrogen by contacting the liquid nitrosyl sulfuric acid-sulfuric acid mixture in a separate zone with oxygen to regenerate and recover sulfuric acid from the mixture as a liquid and nitrogen dioxide as a gas; recycling the sulfuric acid to the reaction zone; and recycling the nitrogen dioxide to the reaction zone as at least a portion of the inorganic oxygen-containing nitrogen compound feed thereto.

14. The process for producing chlorine which comprises: at a temperature between about 125° C. and about 275° C. introducing into a reaction zone, hydrogen chloride and a molar excess of oxygen and reacting the mixture in the presence of an inorganic oxygen-containing compound of nitrogen as a catlyst selected from the group consisting of a nitrogen oxide, nitric acid, nitrosyl chloride and mixtures thereof and in the presence of sulfuric acid of from 70 percent to 90 percent concentration to form a gaseous chlorine product and a sulfuric acid liquid mixture containing nitrosyl sulfuric acid, wherein at least 90 percent of the inorganic oxygen-containing compound of nitrogen is converted to nitrosyl sulfuric acid during the course of the reaction; maintaining the flow rate of sulfuric acid to chlorine product produced in the reaction zone above 10:1; in a finishing zone separately treating the gaseous chlorine product with liquid sulfuric acid of higher concentration of from 75 percent to 95 percent concentration at a temperature below the reaction temperature and recovering substantially pure chlorine gas from the finishing zone as a product of the process; passing the sulfuric acid from the finishing zone to the reaction zone; passing the liquid nitrosyl sulfuric acid-sulfuric acid mixture from the reaction zone to an oxygen treating zone for recovery of liquid sulfuric acid and gaseous nitrogen dioxide; fortifying the regenerated nitrogen dioxide with less than 10 mole percent of fresh nitrogen dioxide feed based on moles of hydrogen chloride in the reaction zone; returning the fortified nitrogen dioxide gas to said reaction zone as part of the catalyst feed thereto; withdrawing the remaining liquid nitrosyl sulfuric acid-sulfuric acid mixture from said oxygen treating zone and subjecting said liquid to treatment with hydrogen chloride to regenerate gaseous nitrosyl chloride and an additional quantity of liquid sulfuric acid; returning said gaseous nitrosyl chloride to said reaction zone as part of the catalyst feed thereto; stripping the remaining liquid sulfuric acid with oxygen in an oxygen stripping zone to recover any hydrogen chloride entrained with the sulfuric acid as a gaseous effluent; passing said gaseous effluent of oxygen and hydrogen chloride from said oxygen stripping zone to said oxygen treating zone; withdrawing the remaining liquid portion of aqueous sulfuric acid from said oxygen stripping zone; adjusting the temperature and concentration of a portion of said aqueous sulfuric acid to that employed in the reaction zone and recycling said sulfuric acid to said reaction zone; adjusting the temperature and concentration of the remaining portion of said aqueous sulfuric acid to that employed in said finishing zone and recycling said remaining portion to said finishing zone.

15. The process of claim 1 wherein the reaction in the reaction zone is carried out in the liquid phase under a pressure of from 600 mm. to 150 atmospheres.

16. The process of claim 1 wherein the reaction is carried out at a temperature between about 150° C. and about 225° C. under a pressure of from about 5 to about 25 atmospheres so that less than 10 percent of the unreacted reactants and by-products of the reaction are vaporized.

17. The process for producing halogen which comprises: reacting an inorganic halide selected from the group consisting of hydrogen chloride and hydrogen bromide with oxygen in the presence of an inorganic oxygen-containing compound of nitrogen as a catalyst selected from the group consisting of a nitrogen oxide, nitric acid, nitrosyl halide and mixtures thereof and in the presence of liquid sulfuric acid of at least 65 percent concentration in a contacting zone of a reaction zone to form the halogen product and to convert a major portion of the inorganic oxygen-containing compound of nitrogen to liquid nitrosyl sulfuric acid during the course of the reaction, the nitrosyl sulfuric acid being formed in the presence of excess liquid sulfuric acid in the contacting zone to form a liquid mixture of the acids; recovering substantially pure halogen product as a gas; auto-regenerating the inorganic oxygen-containing compound of nitrogen by treating the nitrosyl sulfuric acid-sulfuric acid mixture in a separate stripping zone with at least one gas selected from the group consisting of the inorganic halide, oxygen and mixtures thereof to regenerate and recover sulfuric acid as a liquid mixture and the inorganic oxygen-containing compound of nitrogen as a gas; admixing the regenerated inorganic oxygen-containing compound of nitrogen, the inorganic halide and oxygen; passing the resulting admixture into a precontacting zone wherein the gases are reacted at a temperature higher than in the contacting zone; and passing the mixture from the precontacting zone into the contacting zone in direct contact with the liquid sulfuric acid.

18. The process of claim 17 wherein the maximum temperature in the precontacting zone is between 50° C. and 250° C. higher than the maximum temperature in the contacting zone.

19. The process of claim 1 wherein the sulfuric acid is stripped with air to reconcentrate the acid to its original level of concentration.

20. The process of claim 1 wherein halogen is separated from the reaction zone in a gaseous effluent and the halogen is removed from the effluent at a temperature below the temperature of the reaction zone and under an elevated pressure not in excess of 25 atmospheres.

References Cited

UNITED STATES PATENTS

| | | | |
|---|---|---|---|
| 2,793,102 | 5/1957 | Frischer | 23—219 |
| 2,855,279 | 10/1958 | Walter | 23—219 |
| 3,131,028 | 4/1964 | Stow | 23—216 XR |
| 3,152,870 | 10/1964 | Baumgartner et al. | 23—219 |

EDWARD STERN, *Primary Examiner.*

U.S. Cl. X.R.

23—139, 154, 157, 158, 167, 203, 215, 216